US008786861B2

(12) United States Patent
Funamoto

(10) Patent No.: US 8,786,861 B2
(45) Date of Patent: Jul. 22, 2014

(54) OPTICAL DEVICE WITH VARIABLE WAVELENGTH INTERFERENCE FILTER

(75) Inventor: Tatsuaki Funamoto, Shiojiri (JP)

(73) Assignee: Seiko Epson Corporation (JP)

(*) Notice: Subject to any disclaimer, the term of this patent is extended or adjusted under 35 U.S.C. 154(b) by 177 days.

(21) Appl. No.: 13/238,312

(22) Filed: Sep. 21, 2011

(65) Prior Publication Data

US 2012/0120403 A1 May 17, 2012

(30) Foreign Application Priority Data

Nov. 12, 2010 (JP) ................................. 2010-254066

(51) Int. Cl.
*G01J 3/26* (2006.01)
*G02B 13/22* (2006.01)
*G02B 26/00* (2006.01)

(52) U.S. Cl.
CPC . *G01J 3/26* (2013.01); *G02B 13/22* (2013.01); *G02B 26/001* (2013.01)
USPC ........................................................ 356/451

(58) Field of Classification Search
USPC ................... 356/454, 505–506; 359/577–578
See application file for complete search history.

(56) References Cited

U.S. PATENT DOCUMENTS

| 3,984,190 | A  | * | 10/1976 | Barrett et al. | 356/454 |
|---|---|---|---|---|---|
| 6,590,710 | B2 | * | 7/2003 | Hara et al. | 359/579 |
| 7,126,686 | B2 | * | 10/2006 | Tsujita | 356/328 |
| 7,573,578 | B2 | * | 8/2009 | Zribi et al. | 356/454 |
| 7,957,004 | B2 | * | 6/2011 | Johansen et al. | 356/454 |
| 8,130,380 | B2 | * | 3/2012 | Saari | 356/454 |
| 2006/0102987 | A1 | * | 5/2006 | Saiki et al. | 257/632 |
| 2009/0127564 | A1 | * | 5/2009 | Irikura et al. | 257/76 |
| 2009/0266704 | A1 | * | 10/2009 | Hori | 204/192.15 |
| 2010/0245832 | A1 |  | 9/2010 | Saari |  |
| 2011/0205551 | A1 | * | 8/2011 | Saito et al. | 356/519 |

FOREIGN PATENT DOCUMENTS

| JP | 2000-162043 | 6/2000 |
|---|---|---|
| JP | 2009-251105 | 10/2009 |

OTHER PUBLICATIONS

Panfilo C. Deguzma.Stacked subwavelength gratings as circular polarization filters. Nov 1, 2001, Applied Optics Vo 40, 5731.*
J.H. Correia. "Bulk-micromachined tunable Fabry—Perot microinterferometer for the visible spectral range". Nov. 16, 1998.*

* cited by examiner

*Primary Examiner* — Gregory J Toatley
*Assistant Examiner* — Maurice Smith
(74) *Attorney, Agent, or Firm* — Harness, Dickey & Pierce, P.L.C.

(57) ABSTRACT

An optical device includes a telecentric optical system, a variable wavelength interference filter, and a detection section, the variable wavelength interference filter includes a first reflecting film, a second reflecting film provided to a movable section, and an electrostatic actuator adapted to displace the movable section, an effective measurement area capable of transmitting a light with a wavelength, which is within a predetermined allowable range centered on a measurement center wavelength when an amount of the displacement of the movable section takes a maximum displacement value, is set in the first reflecting film and the second reflecting film, and the telecentric optical system guides the incident light to the variable wavelength interference filter so that a principal ray of the incident light is parallel thereto and perpendicular to the first reflecting film, and at the same time, collects the incident light in the effective measurement area.

6 Claims, 10 Drawing Sheets

OPTICAL DEVICE WITH VARIABLE WAVELENGTH INTERFERENCE FILTER

BACKGROUND

1. Technical Field

The invention relates to an optical device provided with a variable wavelength interference filter for taking out light with a predetermined wavelength from incident light.

2. Related Art

In the past, there has been known an interference filter having a pair of reflecting films opposed to each other, and for transmitting or reflecting only the light with a predetermined wavelength, which is reinforced due to multiple interference by the pair of reflecting films, out of the incident light, and further, there has been known an optical device for imaging the light transmitted through such an interference filter with an image sensor (see, e.g., JP-A-2000-162043 (Document 1)).

The optical device described in Document 1 is a device for collimating the incident light such as the light from an object with an objective lens, inputting the light thus collimated vertically to a variable wavelength interference filter, and receiving and then imaging the light transmitted through the variable wavelength interference filter with an image sensor.

In such an optical device, it is required to improve the resolution of the variable wavelength interference filter in order for receiving the light with a target wavelength using the image sensor. As such a variable wavelength interference filter, there can be cited, for example, a filter shown in JP-A-2009-251105 (Document 2).

The variable wavelength interference filer described in Document 2 has a pair of substrates opposed to each other, and one of the substrates is provided with a movable section and a diaphragm for holding the movable section so as to be able to move back and forth with respect to the other of the substrates. Further, the movable section is provided with one of the pair of reflecting films, and the other of the substrates not provided with the movable section is provided with the other of the reflecting films opposed to the reflecting film of the movable section. In such an optical filter device, the dimension of the gap between the pair of reflecting films can be varied by moving back and forth the movable section to thereby make it possible to take out the light corresponding to the dimension of the gap, and at the same time, since an amount of deflection of the movable section with respect to the diaphragm is reduced, it becomes possible to suppress also the deflection of the reflecting film provided to the movable section.

Incidentally, in Document 2, since the movable section is formed to have a thickness dimension larger than that of the diaphragm, it is possible to make the deflection amount of the movable section smaller than the deflection amount of the diaphragm even in the case in which the movable section is displaced. However, in reality, the deflection is also caused in the movable section, and the deflection amount is small in the central portion of the movable section, and increases as the position moves from the center toward the periphery of the movable section. Further, the deflection amount is also affected by the size of the variable wavelength interference filter, if the size of the variable wavelength interference filter is large, for example, the deflection amount of the movable section becomes also large. Therefore, since the deflection is also caused in the reflecting film disposed on the movable section, and the dimension of the gap between the pair of reflecting films fails to be uniform, the resolution is degraded.

Therefore, in the optical device described in Document 1, if the variable wavelength interference filter described above is used, there arises a problem that the measurement accuracy is degraded due to the degradation of the resolution in the variable wavelength interference filter. Further, although it is possible to obtain an image with higher resolution by increasing the size of the image sensor, on this occasion, it is required to also increase the size of the variable wavelength interference filter. However, as described above, if the size of the variable wavelength interference filter is increased, there arises a problem that the deflection amount of the movable section increases to thereby degrade the resolution, and thus the measurement accuracy is degraded.

SUMMARY

An advantage of some aspects of the invention is to provide an optical device capable of highly accurate spectroscopic measurement.

An aspect of the invention is directed to an optical device including a variable wavelength interference filter adapted to transmit a light reinforced by multiple interference out of an incident light, a telecentric optical system adapted to guide the incident light to the variable wavelength interference filter, and a detection section adapted to detect a light transmitted through the variable wavelength interference filter, wherein the variable wavelength interference filter includes a first substrate, a second substrate opposed to the first substrate and provided with a movable section, and a holding section adapted to hold a periphery of the movable section and to hold the movable section so as to allow a back and forth movement of the movable section with respect to the first substrate, a first reflecting film provided to the first substrate, a second reflecting film provided to the movable section, and opposed to the first reflecting film via a gap, and a gap varying section adapted to displace the movable section to thereby vary a dimension of the gap, an effective measurement area capable of transmitting a light with a wavelength, which is within a predetermined allowable range centered on a measurement center wavelength when an amount of the displacement of the movable section due to the gap varying section takes a maximum value, is set in the first reflecting film and the second reflecting film, and the telecentric optical system guides a principal ray of the incident light perpendicularly to one of a plane of the first reflecting film and a plane of the second reflecting film, and collects the incident light in the effective measurement area.

In this aspect of the invention, the telecentric optical system is an image side telecentric optical system, and guides the light so that the principal ray of the light emitted from the telecentric optical system is parallel to the optical axis and perpendicular to the variable wavelength interference filter. Further, the telecentric optical system collects light so that the principal ray is collected in the effective measurement area out of the gap region formed between the first reflecting film and the second reflecting film of the variable wavelength interference filter. It should be noted that the telecentric optical system denotes the optical system arranged so that the principal ray passes through the focal point, namely the optical system in which the principal ray is parallel to the optical axis, namely the field angle is 0 degree. Further, the image side telecentric optical system denotes the optical system which becomes parallel to the principal ray and the optical axis on the image side.

Here, the effective measurement area denotes the area where the degradation of the resolution of the variable wavelength interference filter can be suppressed within a allowable range. Specifically, the light on which the multiple interference is caused in the effective measurement area and transmitted through the effective measurement area out of the gap region between the first reflecting film and the second reflecting film becomes the light with the wavelength within the allowable wavelength range centered on the measurement center wavelength.

Therefore, by collecting the principal ray in the effective measurement area of the variable wavelength interference filter using the telecentric optical system, it is possible to accurately take out the light with the wavelength within the wavelength range centered on the measurement center wavelength from the incident light to make the detection section receive the light. Thus, the degradation of the resolution in the variable wavelength interference filter can be suppressed compared to the case of, for example, inputting the parallel light to the variable wavelength interference filter and taking out the light using also the area of the gap region outside the effective measurement area, and thus the highly accurate spectroscopic measurement can be performed in the optical device.

In the optical device of the above aspect of the invention, it is preferable that the effective measurement area is an area where a difference value between a dimension of the gap along a center axis of the movable section and a dimension of the gap corresponding a peripheral edge of the effective measurement area is one of equal to and smaller than a half of the allowable range if the amount of the displacement of the movable section is set to the maximum displacement value by the gap varying section.

In this configuration, assuming that the difference between the gap dimension corresponding to the point on the center axis of the movable section and the gap dimension corresponding to the peripheral edge of the effective measurement area in the condition of displacing the movable section as much as the maximum displacement amount using the gap varying section is "x," and the allowable range is "$\lambda_0$," the area where the relationship of $x=\lambda_0/2$ is fulfilled is defined as the effective measurement area.

Specifically, in the variable wavelength interference filter, the dimension "d" of the gap and the transmission wavelength "$\lambda$" are expressed as $d=\lambda/2$ assuming that the refractive index of the air is 1. Therefore, assuming that the gap dimension on the center axis of the movable section is "$d_1$," and the gap dimension corresponding to the peripheral edge of the effective measurement area is "$d_2$," the wavelength (the measurement center wavelength) of the light transmitted through the center axis of the movable section becomes $\lambda_1=2d_1$, and the wavelength of the light transmitted through the peripheral edge of the effective measurement area becomes $\lambda_2=2d_2=2(d_1+x)=2(\pi_1/2+x)$.

Here, the wavelength range within the allowable range $\lambda_0$ centered on the measurement center wavelength $\lambda_1$ becomes the range from $\lambda_1-\lambda_0$ to $\lambda_1+\lambda_0$. If the movable section is deflected toward the first substrate, there is no chance for the gap dimension to be smaller than $d_1$, and therefore, if the wavelength $\lambda_2(=2(\lambda/2+x))$ of the light transmitted through the peripheral edge of the effective measurement area is equal to or smaller than $\lambda_1+\lambda_0$, then the light transmitted through the effective measurement area becomes the light having the wavelength within the allowable range $\lambda_0$ centered on the measurement center wavelength $\lambda_1$. Therefore, by collecting the incident light in the effective measurement area where $x \leq \lambda_0/2$ is fulfilled using the telecentric optical system, it becomes possible to make the detection section detect only the light having the wavelength within the allowable range $\lambda_0$ from the measurement center wavelength $\lambda_1$.

In the optical device of the above aspect of the invention, it is preferable that there is further provided a magnifying lens system disposed between the variable wavelength interference filter and the detection section, and adapted to magnify the light transmitted through the variable wavelength interference filter.

According to this configuration, since there is adopted a configuration of collecting the incident light using the telecentric optical system, it is possible to make a contribution to the downsizing of the variable wavelength interference filter. In addition thereto, by providing the magnifying lens system, it is possible to magnify the light transmitted through the variable wavelength interference filter, and then emit the light toward the detection section. According to such a configuration, the size of the detection section alone can be enlarged without enlarging the size of the variable wavelength interference filter, and it is possible to further improve the detection accuracy.

In the optical device of the above aspect of the invention, it is preferable that there is further provided a first circularly polarizing plate disposed between the telecentric optical system and the variable wavelength interference filter, and adapted to transmit a light proceeding from the telecentric optical system toward the variable wavelength interference filter, and absorb a light proceeding from the variable wavelength interference filter toward the telecentric optical system.

In this configuration, the first circularly polarizing plate is disposed between the variable wavelength interference filter and the telecentric optical system.

In general, in the variable wavelength interference filter, the light on which the multiple interference is caused between the first reflecting film and the second reflecting film and is reinforced is transmitted toward the detection section, and the light component fails to be transmitted is mostly reflected toward the entrance side. If such a reflected component returns to the telecentric optical system, the reflected component is further reflected inside the lens and between the lenses to cause ghost or flare, and the detection accuracy in the detection section is degraded.

In contrast, according to the configuration of the invention, the first circularly polarizing plate can prevent the light reflected by the variable wavelength interference filter from returning to the telecentric optical system to thereby prevent the ghost or the moire fringes from occurring, thus the detection accuracy in the detection section can be improved.

In the optical device of the above aspect of the invention, it is preferable that there is further provided a second circularly polarizing plate disposed between the variable wavelength interference filter and the detection section, and adapted to transmit a light proceeding from the variable wavelength interference filter toward the detection section, and absorb a light proceeding from the detection section toward the variable wavelength interference filter.

According to this configuration, the second circularly polarizing plate is disposed between the variable wavelength interference filter and the detection section, and it is possible to prevent the problem that the light reflected by the detection section returns to the variable wavelength interference filter, and then further makes the mirror reflection to return to the detection section.

Further, it is also possible to use both of the first circularly polarizing plate and the second circularly polarizing plate, and in such a case, the polarization direction of the linearly polarizing plate of the first circularly polarizing plate and the polarization direction of the linearly polarizing plate of the second circularly polarizing plate are aligned to each other.

Thus, it is possible to prevent the light reflected by the variable wavelength interference filter from returning to the telecentric optical system, and to prevent the light reflected by the detection section from returning to the detection section via the variable wavelength interference filter, and thus the detection accuracy can further be improved.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

A first embodiment of the invention will hereinafter be explained with reference to the accompanying drawings.
1. Overall Configuration of Optical Device FIG. 1 is a diagram showing a schematic configuration of an optical device 1 according to the present embodiment of the invention.

Figure 1:
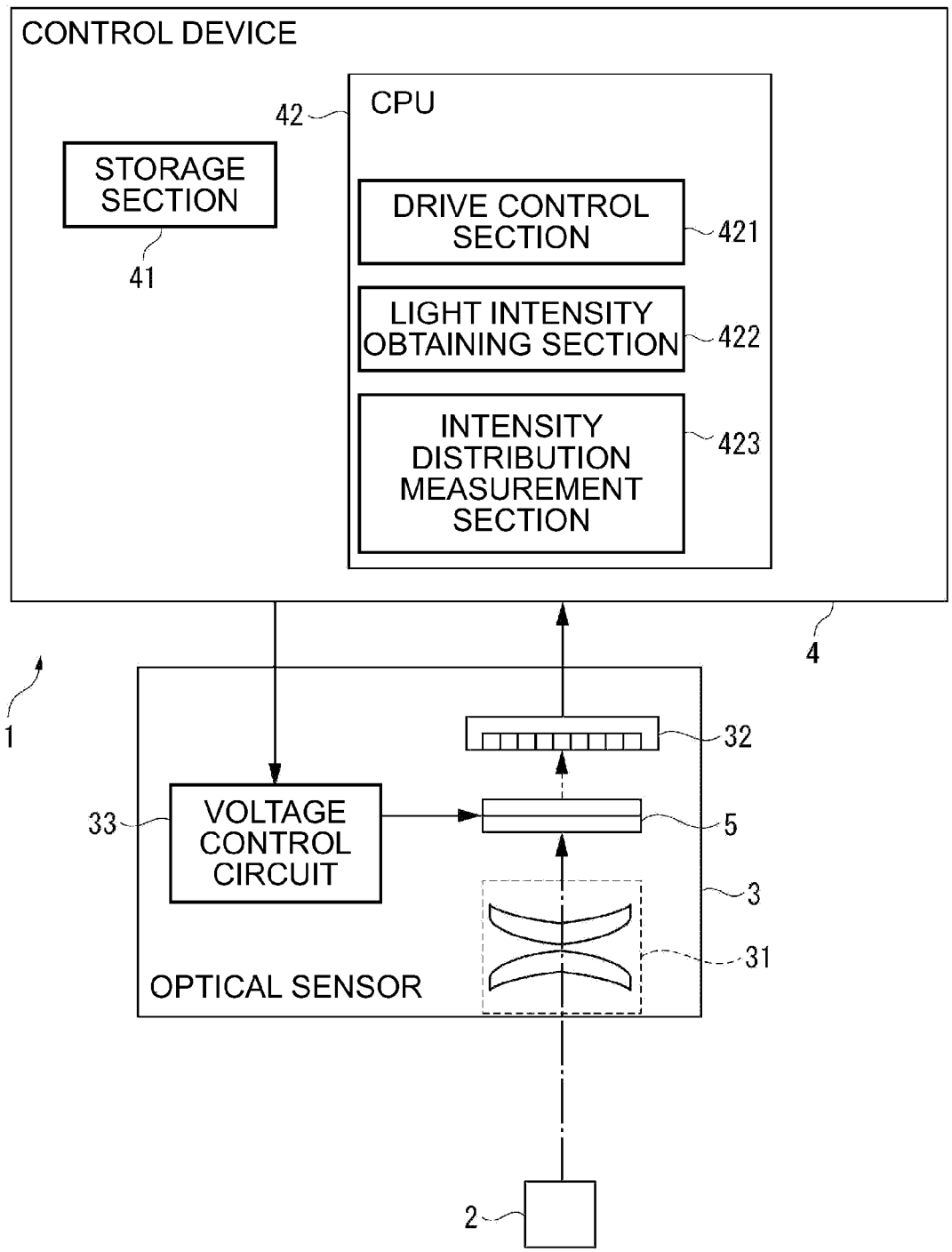
FIG. 1 is a diagram showing a schematic configuration of an optical device according to a first embodiment of the invention.

As shown in FIG. 1, the optical device 1 is provided with an optical sensor 3, and a control device 4. Further, the optical device 1 is a spectroscopic camera device, which is a device for shooting the image of a measurement object 2 with a detection section 32, and then measuring the dispersed light intensity distribution characteristics.
2. Configuration of Optical Sensor As shown in FIG. 1, the optical sensor 3 is provided with a variable wavelength interference filter 5, a telecentric optical system 31 for guiding the light to the variable wavelength interference filter 5, the detection section 32 for receiving the light transmitted through the variable wavelength interference filter 5, and a voltage control circuit 33 for varying the wavelength of the light to be transmitted through the variable wavelength interference filter 5.
2-1. Configuration of Variable Wavelength Interference Filter FIG. 2 is a cross-sectional view showing a schematic configuration of the variable wavelength interference filter.

Figure 2:
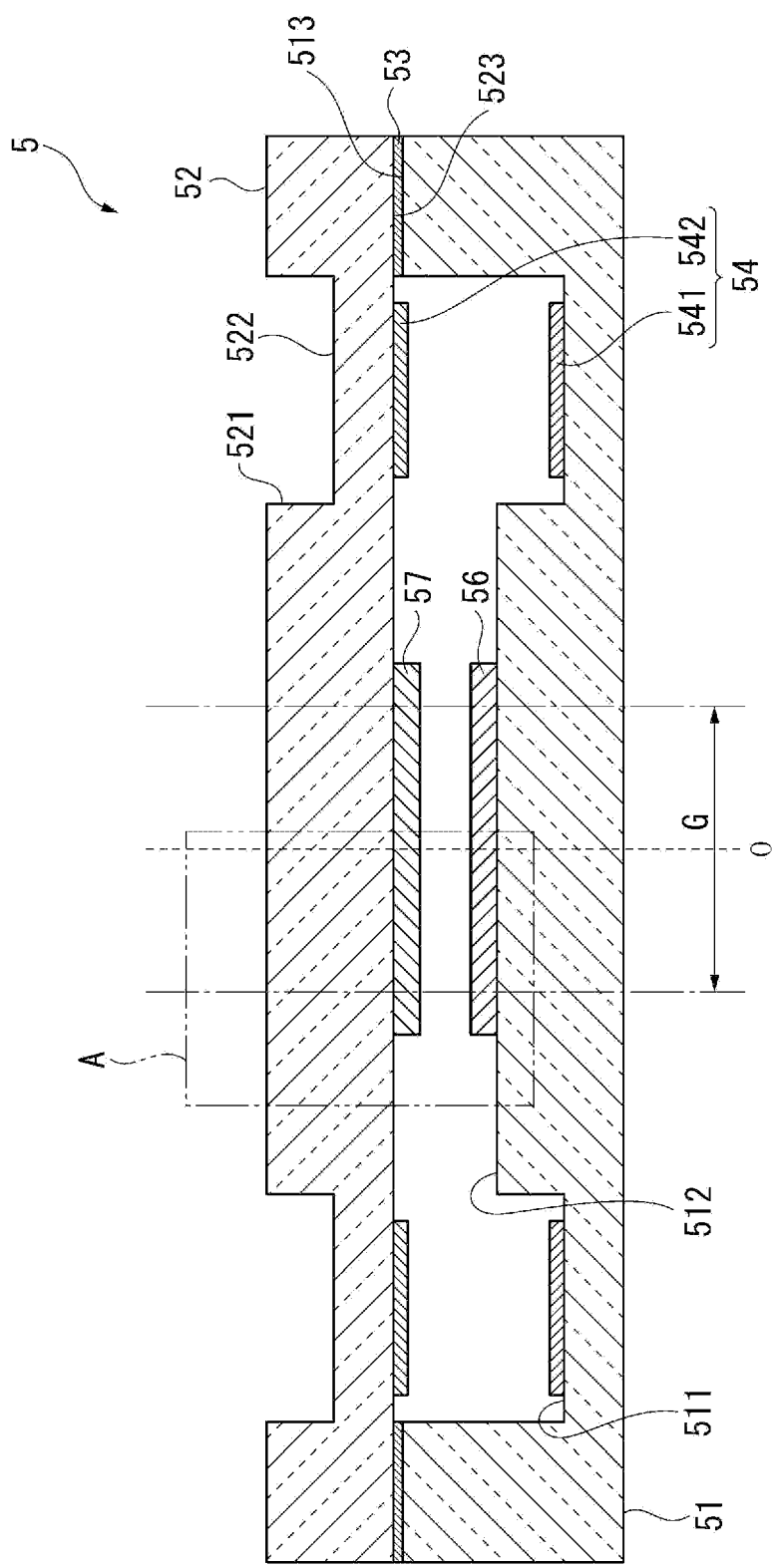
FIG. 2 is a cross-sectional view showing a schematic configuration of a variable wavelength interference filter according to the first embodiment.

As shown in FIG. 2, the variable wavelength interference filter 5 is provided with a first substrate 51 and a second substrate 52. These two substrates 51, 52 are each made of a material capable of transmitting the light in the visible range such as a variety of types of glass including, for example, soda glass, crystalline glass, quartz glass, lead glass, potassium glass, borosilicate glass, and alkali-free glass, or quartz crystal. Further, these two substrates 51, 52 are integrally configured by bonding the bonding surfaces 513, 523 formed along the respective peripheral edges to each other with a plasma-polymerized film 53 consisting primarily of, for example, siloxane.

Further, between the first substrate 51 and the second substrate 52, there are disposed a first reflecting film 56 and a second reflecting film 57. Here, the first reflecting film 56 is fixed to a surface of the first substrate 51 opposed to the second substrate 52, and the second reflecting film 57 is fixed to a surface of the second substrate 52 opposed to the first substrate 51. Further, the first reflecting film 56 and the second reflecting film 57 are disposed so as to be opposed to each other via a gap. Here, the space sandwiched between the first reflecting film 56 and the second reflecting film 57 is referred to as a gap region. Further, the variable wavelength interference filter 5 causes multiple interference in the incident light in the gap region to thereby transmit the reinforced light.

Further, between the first substrate 51 and the second substrate 52, there is disposed an electrostatic actuator 54 as a gap varying section according to the invention. The electrostatic actuator 54 is constituted by a first electrode 541 provided to the first substrate 51 and a second electrode 542 provided to the second substrate 52.
2-1-1. Configuration of First Substrate An electrode groove 511 and a mirror fixation section 512 are formed on the opposed surface of the first substrate 51 opposed to the second substrate 52 using an etching process.

Although not shown in the drawing, the electrode groove 511 is formed to have a ring shape centered on the center point of the plane in a plan view of the first substrate 51 viewed in a substrate thickness direction.

The mirror fixation section 512 is formed to have a cylindrical shape coaxial with the electrode groove 511 and projecting toward the second substrate 52.

On the bottom surface of the electrode groove 511, there is formed the first electrode 541 having a ring-like shape constituting the electrostatic actuator 54. Further, the first electrode 541 is provided with a first electrode line (not shown), which is extending along a wiring groove, and is formed toward the periphery of the first substrate 51. Further, the tip of the first electrode line is connected to a voltage control circuit 33.

Further, on the surface of the mirror fixation section 512 opposed to the second substrate 52, there is fixed the first reflecting film 56. The first reflecting film 56 can be a dielectric multilayer film composed of layers made of, for example, $SiO_2$ and $TiO_2$ stacked on each other, or a film formed of a metal film made of, for example, an Ag alloy. Further, the configuration of stacking both of the dielectric multilayer film and the metal film can also be adopted.

Further, in an area of the surface of the first substrate outside the electrode groove 511, there is formed a first bonding surface 513. As described above, the first bonding surface 513 is provided with the plasma-polymerized film 53 for bonding the first substrate 51 and the second substrate 52 to each other.

2-1-2. Configuration of Second Substrate

The second substrate 52 has a surface not opposed to the first substrate 51 formed by being processed using an etching process. The second substrate 52 is provided with a movable section 521 having a cylindrical shape centered on the center point of the substrate, and a holding section 522 coaxial with the movable section 521 and for holding the movable section 521. Here, the holding section 522 is formed to have a dimension of the external diameter identical to the dimension of the external diameter of the electrode groove 511 of the first substrate 51.

The movable section 521 is formed to have a thickness dimension larger than that of the holding section 522 in order for preventing the deflection.

The holding section 522 is a diaphragm surrounding the periphery of the movable section 521, and is formed to have a thickness dimension of, for example, 50 μm. It should be noted that although the holding section 522 shaped like a diaphragm is shown as an example in the present embodiment, it is also possible to adopt, for example, a configuration provided with a holding section having a plurality of pairs of beam structures disposed at positions symmetrical about the center of the movable section.

The surface of the holding section 522 opposed to the first substrate 51 is provided with a second electrode 542 having a ring-like shape and opposed to the first electrode 541 with a predetermined gap. Here, as described above, the second electrode 542 and the first electrode 541 described above constitute the electrostatic actuator 54.

Further, a second electrode line (not shown) is formed from a part of the peripheral edge of the second electrode 542 toward the periphery of the second substrate 52, and the tip of the second electrode line is connected to a voltage control circuit 33.

On the surface of the movable section 521 opposed to the first substrate 51, there is formed the second reflecting film 57 opposed to the first reflecting film 56 via a gap. It should be noted that the configuration of the second reflecting film 57 is the same as that of the first reflecting film 56, and therefore, the explanation here will be omitted.

2-1-3. Operation of Variable Wavelength Interference Filter When Applying Voltage and Effective Measurement Area FIG. 3 is an enlarged view of the part indicated by the dashed-two dotted line A shown in FIG. 2 in the condition in which a voltage is applied between the first electrode 541 and the second electrode 542 to thereby fully deflect the movable section 521 toward the first substrate 51.

Figure 3:
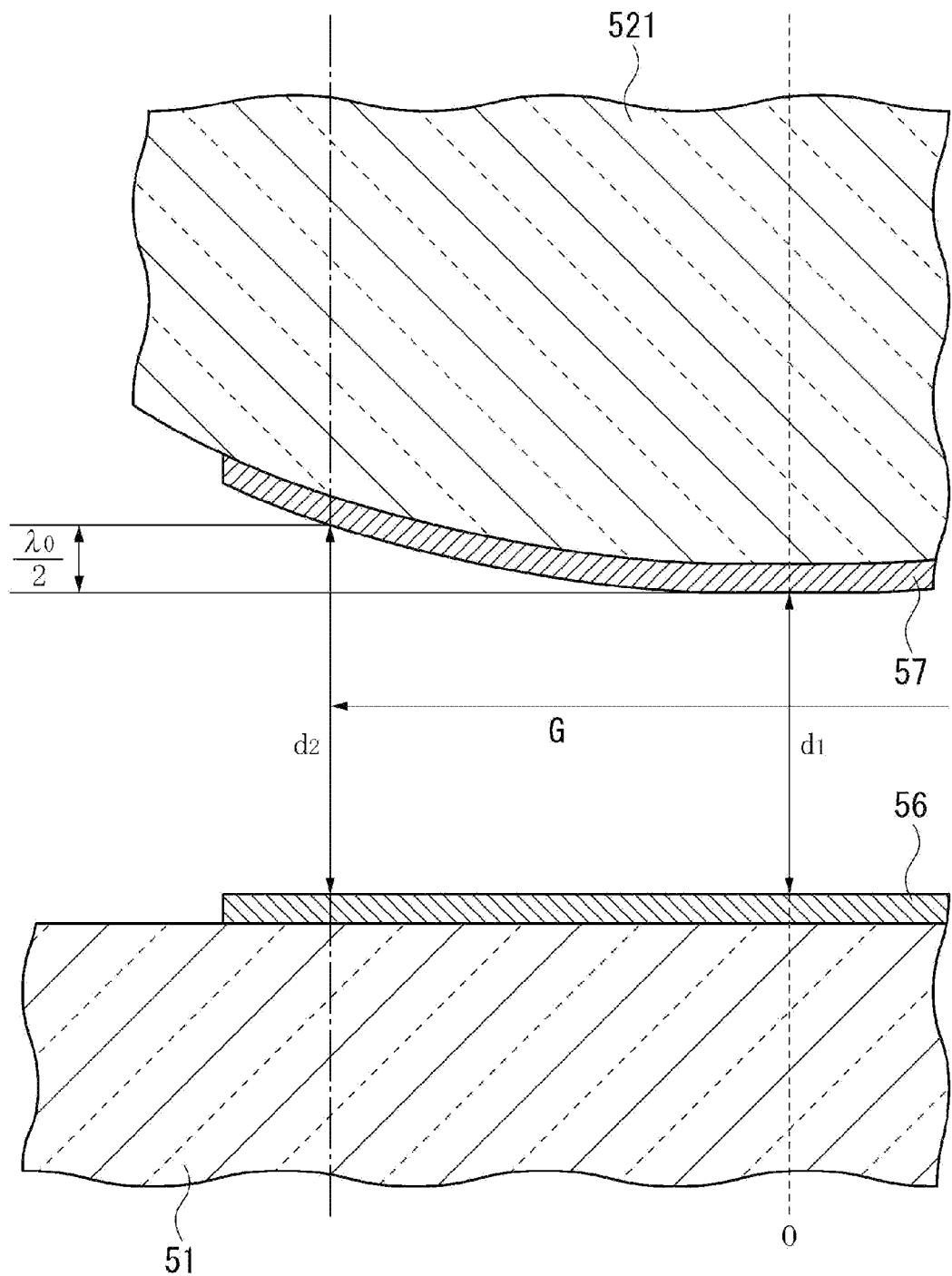
FIG. 3 is an enlarged view of the part indicated by the dashed-two dotted line A shown in FIG. 2 in the condition in which a voltage is applied between a first electrode and a second electrode to thereby fully deflect the movable section toward a first substrate.

In the initial state shown in FIG. 2, when the voltage control circuit 33 applies a drive voltage between the first electrode 541 and the second electrode 542, the movable section 521 of the second substrate 52 is displaced toward the first substrate 51 due to the electrostatic attractive force as shown in FIG. 3.

In this case, although the movable section 521 is formed to have a thickness dimension larger than that of the holding section 522 shaped like a diaphragm, and therefore, has a shape difficult to deflect, minute deflection occurs in reality due to the deflection of the holding section 522. Here, the amount of deflection of the movable section 521 increases as the distance from the center axis O of the movable section 521 increases. Therefore, in the periphery of the movable section 521, the dimension of the gap between the second reflecting film 57 formed on the movable section 521 and the first reflecting film 56 opposed thereto also increases. On this occasion, a difference in the peak wavelength is caused between the light transmitted through a part of the gap region located on the center axis O of the movable section 521 and the light transmitted through the peripheral part of the gap region, and thus the resolution of the variable wavelength interference filter 5 is degraded.

The difference in the peak wavelength described above is required to be suppressed within a previously determined allowable range in order for improve the detection accuracy in the detection section 32. In the embodiment of the invention, a part of the gap region where the difference in the peak wavelength can be suppressed within the allowable range is defined as an effective measurement area G, and the incident light is collected within the effective measurement area G (the area between the dashed-dotted lines of the surfaces of the first reflecting film 56 and the second reflecting film 57 shown in FIGS. 2 and 3) using the telecentric optical system 31. Thus, the detection section 32 is made to detect only the light transmitted through the effective measurement area G.

Here, assuming that the effective measurement area G is an area capable of transmitting the light with a wavelength within an allowable value $\lambda_0$ from the measurement center wavelength $\lambda_1$ of the light transmitted through the area on the center axis O of the movable section 521, the effective measurement area G corresponds to the area where the amount of deflection of the movable section 521 in the thickness direction is equal to or smaller than $\lambda_0/2$ in the condition in which the movable section 521 is fully displaced toward the first substrate 51. Specifically, assuming that the gap dimension on the center axis O of the movable section 521 is $d_1$, and the gap dimension in the peripheral edge of the effective measurement area G is $d_2$, Formula (1) below is true.

$$d_2 - d_1 = \lambda_0/2 \tag{1}$$

Further, the allowable value $\lambda_0$ is appropriately determined in accordance with the purpose of the optical device 1, and is preferably set equal to or smaller than 5 nm in the case of measuring the dispersion spectrum distribution of the visible range as a typical image sensor, for example, and is preferably set equal to or smaller than 10 nm in the case of using infrared light. Therefore, in the variable wavelength interference filter 5, it is preferable to set the area, where the amount of deflection is equal to or smaller than 2.5 through 5 nm in the case of fully displacing the movable section 521, as the effective measurement area G.

2-2. Configuration of Telecentric Optical System

The telecentric optical system 31 is an optical system for guiding the incident light from the measurement object 2 to the variable wavelength interference filter 5, and is composed of a plurality of optical components such as a lens.

Figure 4:
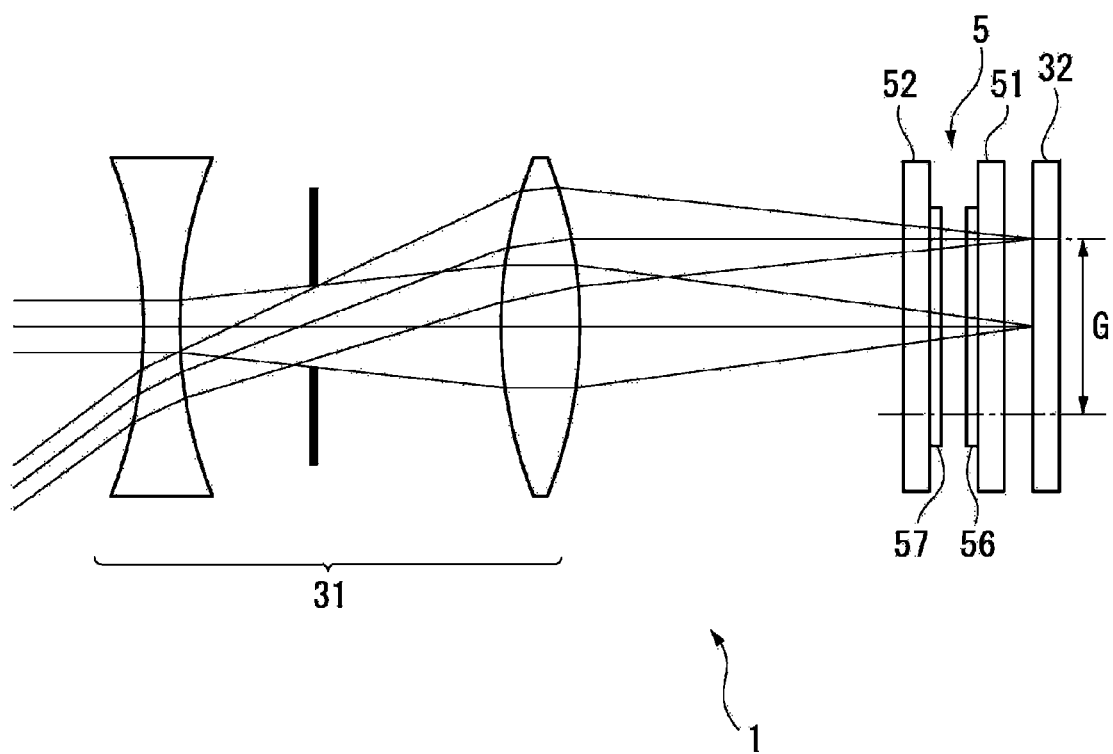
FIG. 4 is a diagram showing light paths of light beams guided by a telecentric optical system in the optical device according to the first embodiment.
Figure 5:
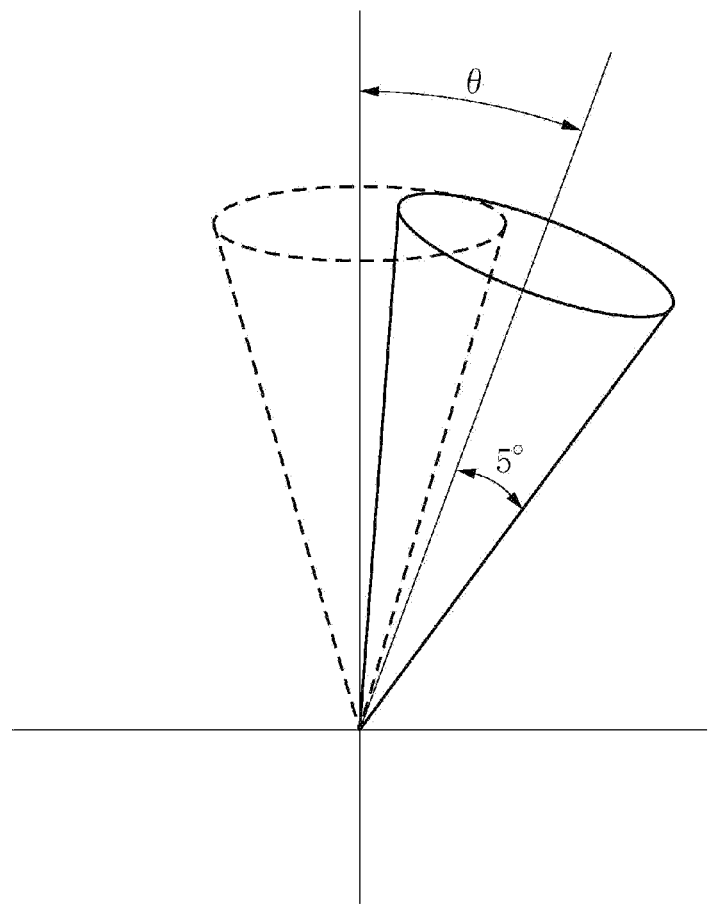
FIG. 5 is a diagram showing a rough outline of the shape of the light beam emitted from the telecentric optical system.

FIG. 4 is a diagram showing light paths of light beams guided by the telecentric optical system 31. FIG. 5 is a diagram showing a rough outline of the shape of the light beam emitted from the telecentric optical system 31.

The telecentric optical system 31 guides the light input from a range (a field angle), which can be imaged by the optical device 1, to the variable wavelength interference filter 5 via a plurality of lenses. Here, the telecentric optical system 31 converts the light input from the object to the optical device 1 into a light beam having a conical shape shown in FIG. 5. Further, the telecentric optical system 31 emits the light so that the principal ray of the light is parallel to the optical axis, and is perpendicular to the first substrate 51 (the first reflecting film 56) of the variable wavelength interference filter 5. Further, the telecentric optical system 31 guides the light input to the field angle range, which can be imaged, so as to be collected to the inside of the effective measurement area G of the variable wavelength interference filter 5.

Figure 6:
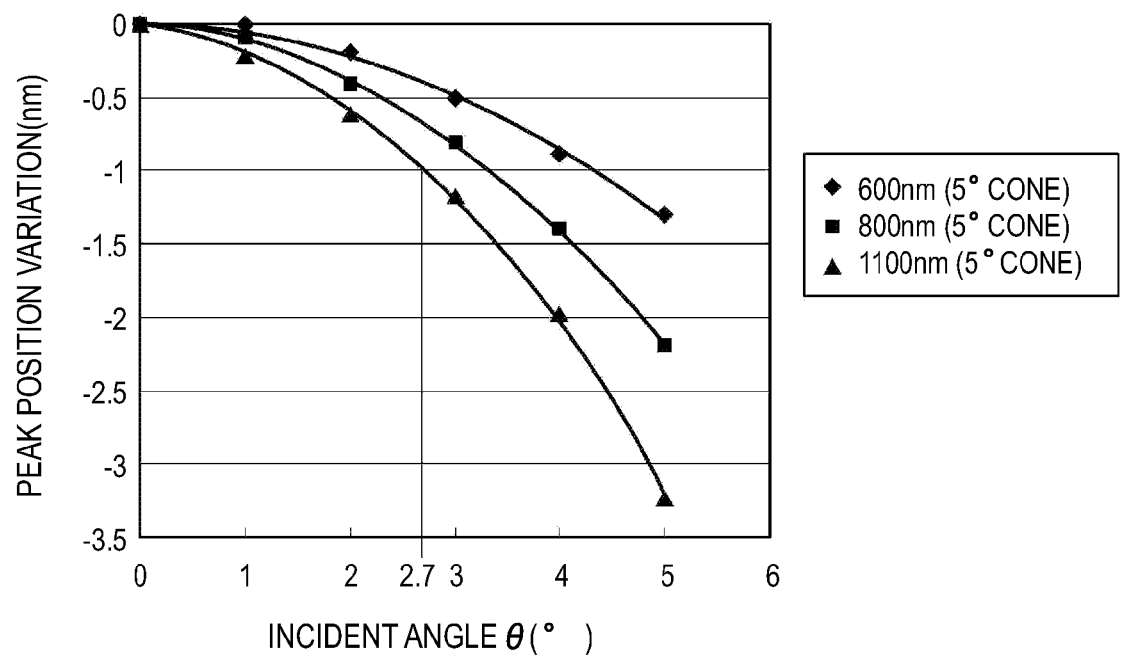
FIG. 6 is a diagram showing the peak wavelength variation of the light transmitted through the variable wavelength interference filter with respect to the tilt of a principal ray.

It should be noted that "perpendicular" described here includes the angle with which no difference in the peak wavelength is caused in the light transmitted through the variable wavelength interference filter 5 as well. FIG. 6 is a diagram showing the peak wavelength variation of the light transmitted through the variable wavelength interference filter with respect to the tilt of the principal ray. In FIG. 6, it is assumed that the one-sided gradient of the light beam having a conical shape input to the variable wavelength interference filter is set to 5 degrees as shown in FIG. 5.

As shown in FIG. 6, the peak wavelength of the light transmitted through the variable wavelength interference filter 5 varies significantly as the variation in the incident angle increases. Further, the variation in the peak wavelength also increases as the wavelength increases. Therefore, in the lens design of the telecentric optical system 31, setting can preferably be performed in accordance with how much variation in the peak wavelength can be allowed with respect to the wavelength band desired to be transmitted through the variable wavelength interference filter 5.

For example, in the case of inputting the light of 1100 nm into the variable wavelength interference filter 5, if the incident angle is shifted 2.7 degree, the variation of 1 nm is caused in the peak wavelength. Therefore, when making the variable wavelength interference filter 5 perform dispersion on the wavelength band equal to or shorter than 1100 nm, if the variation in the peak wavelength due to the incident angle of the principal ray is desired to be suppressed to a level equal to or smaller than 1 nm, it is required to suppress the tilt of the principal ray of the light beam emitted from the telecentric optical system 31 to a level no larger than 2.7 degree.

2-3. Configuration of Detection Section

Returning to FIG. 1, the detection section 32 is disposed on the focal plane of the telecentric optical system 31, and the image light of the image inside the field angle is guided by the telecentric optical system 31, and is formed as an image on the detection section 32 and then taken as an image by the detection section 32.

The detection section 32 is provided with a plurality of detection elements (not shown) arranged as an array. These detection elements are formed of photoelectric conversion elements such as charge coupled devices (CCD), and generate electric signals corresponding to the light intensity of the light received, then output the electric signals to the control device 4. The detection section 32 is disposed on the focal plane of the telecentric optical system 31.

2-4. Configuration of Voltage Control Circuit

The voltage control circuit 33 controls the voltages applied respectively to the first electrode 541 and the second electrode 542 of the electrostatic actuator 54 in accordance with the control of the control device 4.

3. Configuration of Control Device

The control device 4 controls overall operations of the optical device 1.

The control device 4 is a computer composed mainly of a storage section 41, and a central processing unit (CPU) 42, and for example, a general-purpose computer, a portable information terminal, and a computer dedicated to measurement can be used.

Further, the control device 4 is provided with a drive control section 421, a light intensity obtaining section 422, and an intensity distribution measurement section 423 as the software executed on the CPU 42.

The storage section 41 stores various programs performed on the CPU 42 and various data. Further, the storage section 41 stores correlation data representing the wavelength of the transmitted light detected by the detection section 32 with respect to the drive voltage applied to the electrostatic actuator 54.

Then, the drive control section 421, the light intensity obtaining section 422, and the intensity distribution measurement section 423 as the software executed on the CPU 42 will be explained.

The drive control section 421 obtains a voltage value (an input value) with which the detection section 32 can receive the measurement object light based on the correlation data stored in the storage section 41, and then output the voltage value thus obtained to the voltage control circuit 33 to thereby vary the distance of the gap of the variable wavelength interference filter 5.

The light intensity obtaining section 422 obtains the intensity of the received light detected by each of the detection elements of the detection section 32. The intensity of the received light thus obtained is stored in the storage section 41 in conjunction with the position data of the detection elements.

The intensity distribution measurement section 423 creates a light intensity distribution map based on the light intensity of the measurement object light detected by each of the detection elements thus obtained by the light intensity obtaining section 422.

For example, the intensity distribution measurement section 423 creates the light intensity distribution map having pixels corresponding to the coordination positions of the respective detection elements, and sets a color, a gray value, and so on of each of the pixels in accordance with the intensity of the light received by the detection element corresponding to the pixel.

Action and Advantages of First Embodiment

The optical device 1 according to the first embodiment described above is provided with the variable wavelength interference filter 5, the telecentric optical system 31 for guiding the incident light to the variable wavelength interference filter 5, and the detection section 32. Further, the telecentric optical system 31 is an image side telecentric optical system, and emits the light beam having the principal ray parallel to the optical axis and perpendicular to the plane of the first reflecting film 56 toward the variable wavelength interference filter 5. Further, the telecentric optical system 31 inputs the incident light within the range of the field angle to the effective measurement area G where the wavelength of the transmitted light is within the allowable value $\lambda_0$ from the measurement center wavelength $\lambda_1$.

Specifically, assuming that the gap dimension on the center axis O of the movable section 521 is $d_1$, the telecentric optical system 31 input the incident light within the field angle range in the area where the gap dimension $d_2$ fulfills $d_1 \leq d_2 < d_1 + \lambda_0$ in the condition in which the movable section 521 is fully displaced.

Therefore, the variable wavelength interference filter 5 can transmit the light having the wavelength within the allowable range $\lambda_0$ centered on the measurement center wavelength, and thus the resolution can be improved. Further, by receiving such transmitted light by the detection section 32, accurate measurement of the spectral characteristics of the image light can be performed, and thus the measurement accuracy can be improved.

Second Embodiment

A second embodiment of the invention will now be explained with reference to the accompanying drawings.

Figure 7:
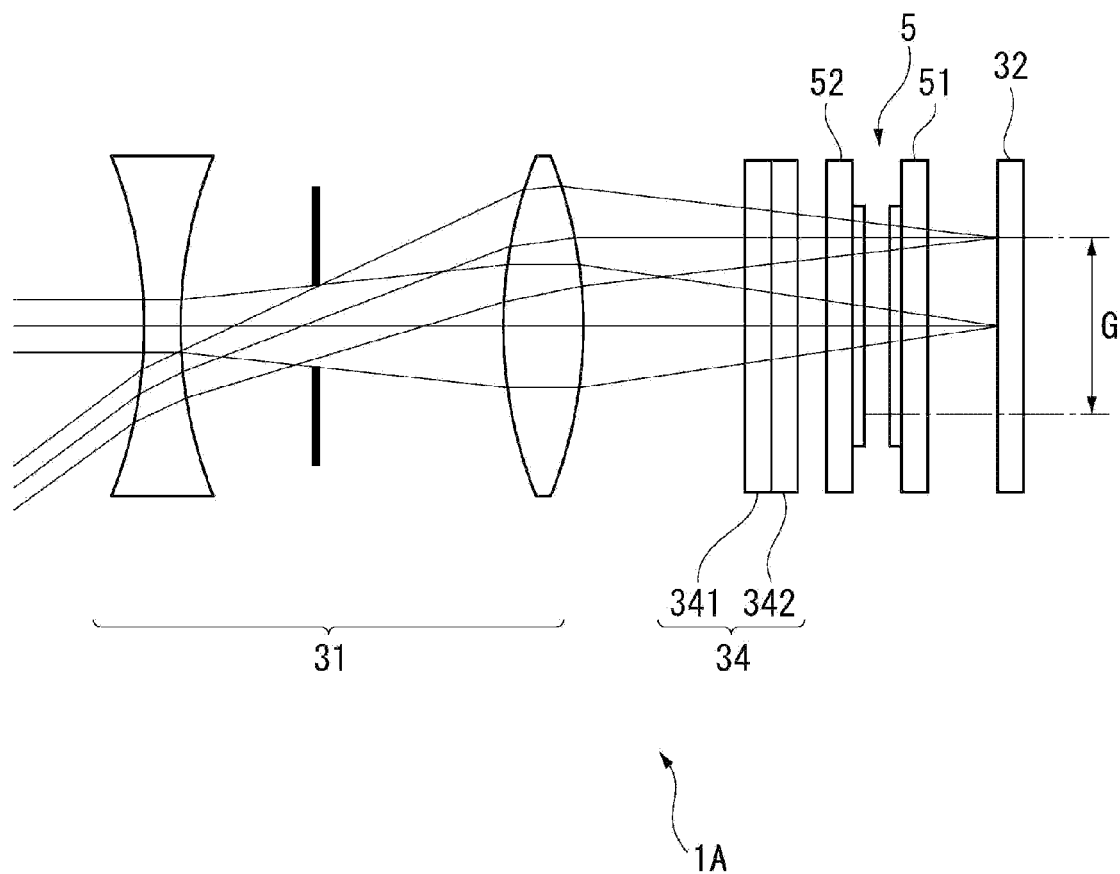
FIG. 7 is a diagram showing light paths of light beams guided by a telecentric optical system of the optical device according to a second embodiment of the invention.

FIG. 7 is a diagram showing light paths of light beams guided by a telecentric optical system of the optical device according to the second embodiment of the invention.

As shown in FIG. 7, in the optical device 1A of the second embodiment, a first circularly polarizing plate 34 is disposed between the telecentric optical system 31 and the variable wavelength interference filter 5 in the optical device 1 of the first embodiment.

The first circularly polarizing plate 34 is composed of a linearly polarizing plate 341 facing to the telecentric optical system 31 and a ¼-wave plate 342 facing to the variable wavelength interference filter 5 combined with each other.

In such a first circularly polarizing plate 34, the linearly polarizing plate 341 transmits only, for example, the P-polarized wave and absorbs the S-polarized wave out of the light input from the telecentric optical system 31. Further, the ¼-wave plate 342 converts the P-polarized wave thus transmitted into the circularly polarized light (the right-handed circularly polarized wave), and then emits it toward the variable wavelength interference filter 5.

Incidentally, in the variable wavelength interference filter 5, the light reinforced by the multiple interference is transmitted toward the detection section 32 as the transmitted light, while the light with the other wavelengths are almost reflected toward the telecentric optical system 31.

On this occasion, the reflected light is reversed in the rotation direction. For example, since in the present embodiment, the conversion into the right-handed circularly polarized wave is performed by the ¼-wave plate 342, the reflected light becomes the left-handed circularly polarized wave. When entering the ¼-wave plate 342 of the first circularly polarizing plate 34, such a left-handed circularly polarized wave is converted into the S-polarized wave, then absorbed by the linearly polarizing plate 341, but not transmitted toward the telecentric optical system 31.

Action and Advantages of Second Embodiment

In the optical device 1A according to the second embodiment described above, the first circularly polarizing plate 34 is disposed between the telecentric optical system 31 and the variable wavelength interference filter 5, and the first circularly polarizing plate 34 is composed of the linearly polarizing plate 341 facing to the telecentric optical system 31 and the ¼-wave plate 342 facing to the variable wavelength interference filter 5 combined with each other.

Therefore, the first circularly polarizing plate 34 can transmit the incident light from the telecentric optical system 31 toward the variable wavelength interference filter 5, and absorb the light reflected by the variable wavelength interference filter 5. Thus, there is no chance for the light reflected by the variable wavelength interference filter 5 to return to the telecentric optical system 31, and thus, the moire fringes or the ghost caused by such a reflected wave being reflected inside the lens or between the lenses of the telecentric optical system can also be prevented from occurring. Therefore, the degradation of the light intensity measurement accuracy in the detection section 32 can be prevented.

Third Embodiment

Then, an optical device according to a third embodiment of the invention will be explained with reference to the accompanying drawings.

Figure 8:
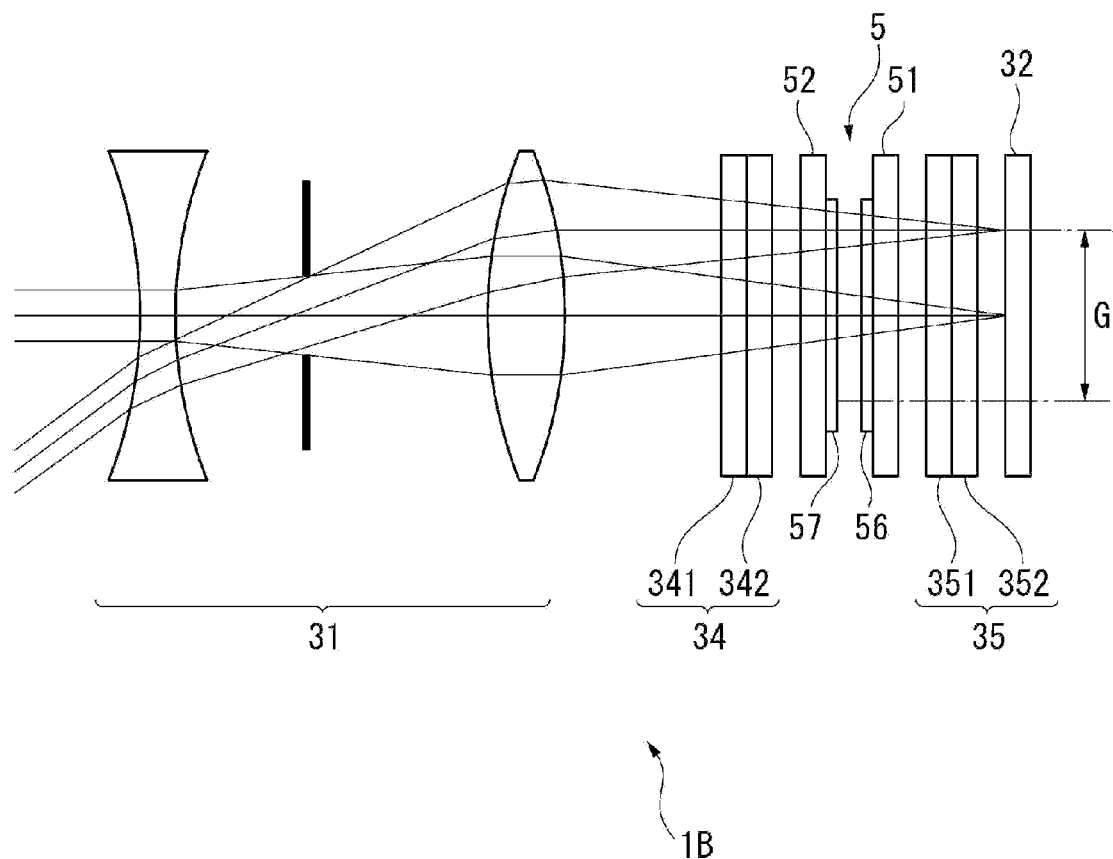
FIG. 8 is a diagram showing light paths of light beams guided by a telecentric optical system of the optical device according to a third embodiment of the invention.

FIG. 8 is a diagram showing a schematic configuration of an optical device 1B according to the third embodiment.

As shown in FIG. 8, in the optical device 1B of the third embodiment, a second circularly polarizing plate 35 is further disposed between the variable wavelength interference filter 5 and the detection section 32 in the optical device 1A of the second embodiment.

The second circularly polarizing plate 35 is composed of a ¼-wave plate 351 facing to the variable wavelength interference filter 5 and a linearly polarizing plate 352 facing to the detection section 32 combined with each other. Here, the linearly polarizing plate 352 has the same polarization direction as that of the linearly polarizing plate 341 of the first circularly polarizing plate 34, and transmits the P-polarized wave.

The right-handed circularly polarized wave is input to the variable wavelength interference filter 5 due to the first circularly polarizing plate 34. Further, in the second circularly polarizing plate 35, the ¼-wave plate 351 converts the right-handed circularly polarized wave transmitted through the variable wavelength interference filter 5 into the linearly polarized light (P-polarized wave). The linearly polarized light is transmitted through the linearly polarizing plate 352, and is emitted toward the detection section 32.

Meanwhile, the light component reflected by the detection section 32 is transmitted through the second circularly polarizing plate 35, and is reflected by the variable wavelength interference filter 5. The reflected light is absorbed by the linearly polarizing plate 352 of the second circularly polarizing plate 35, and is prevented from returning to the detection section 32.

Action and Advantages of Third Embodiment

In the optical device 1B according to the third embodiment described above, the second circularly polarizing plate 35 is disposed between the variable wavelength interference filter 5 and the detection section 32, and the second circularly polarizing plate 35 is composed of the ¼-wave plate 351 facing to the variable wavelength interference filter 5 and the linearly polarizing plate 352 facing to the detection section 32 combined with each other.

Therefore, the second circularly polarizing plate 35 can transmit the incident light from the variable wavelength interference filter 5 toward the detection section 32, and absorb the light reflected by the detection section 32. Thus, since there is no chance for the light reflected by the detection section 32 to return to the variable wavelength interference filter 5, and therefore there is no chance for the multiple interference to be caused again in such reflected wave in the gap of the variable wavelength interference filter 5, the degradation of the light intensity measurement accuracy in the detection section 32 can be prevented.

Fourth Embodiment

Then, an optical device 1C according to a fourth embodiment of the invention will be explained with reference to the accompanying drawings.

Figure 9:
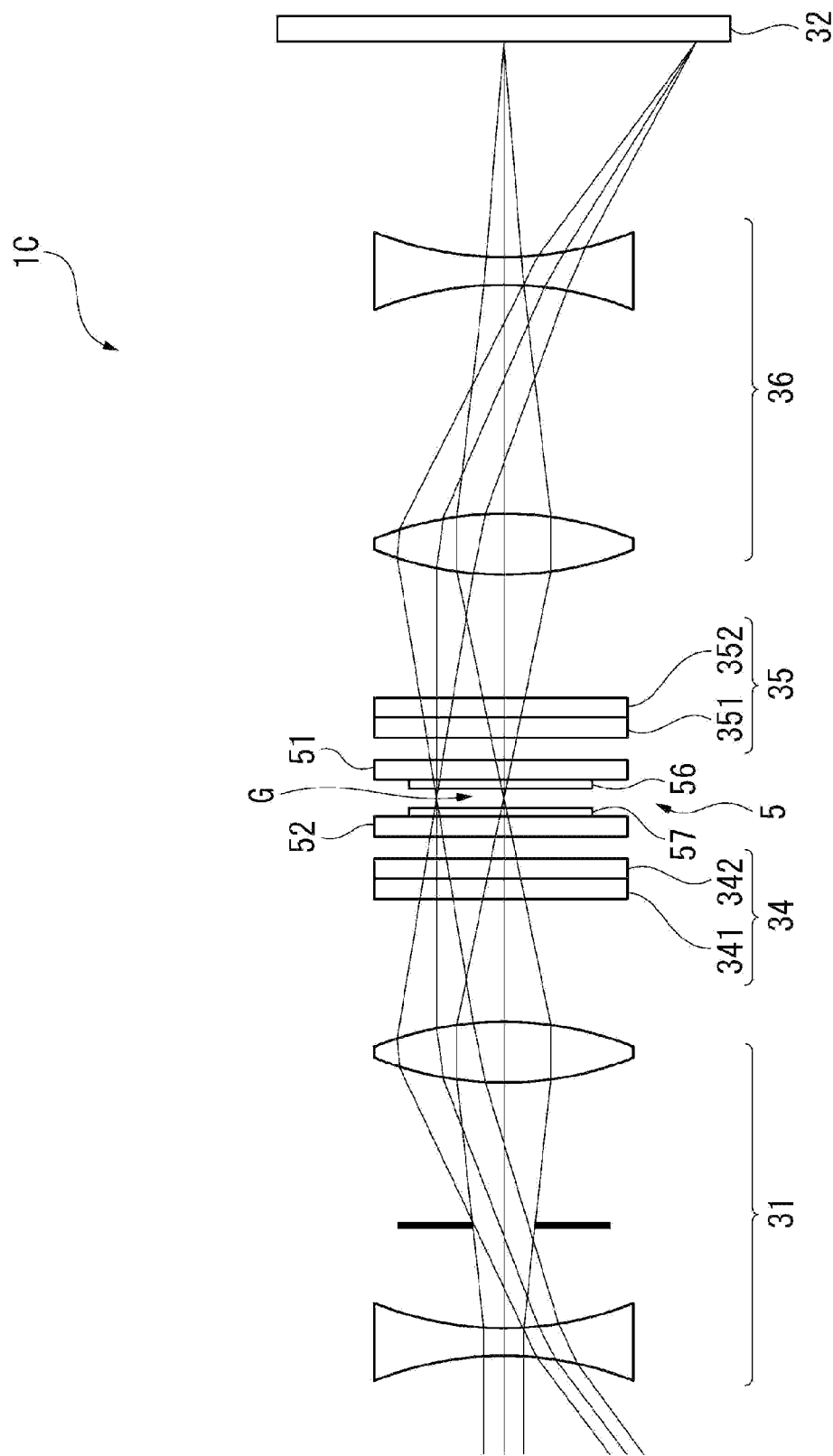
FIG. 9 is a diagram showing light paths of light beams guided by a telecentric optical system of the optical device according to a fourth embodiment of the invention.

FIG. 9 is a diagram showing a schematic configuration of the optical device 1C according to the fourth embodiment.

As shown in FIG. 9, the optical device 1C according to the fourth embodiment is a modification of the optical device 1B according to the third embodiment, and has a magnifying lens system 36 disposed between the second circularly polarizing plate 35 and the detection section 32.

Further, in the optical device 1C, the variable wavelength interference filter 5 is disposed on the focal plane of the telecentric optical system 31, and the detection section 32 is disposed on the focal plane of the magnifying lens system 36.

In such an optical device 1C, the light transmitted through the variable wavelength interference filter 5 is magnified by the magnifying lens system 36, and is then detected by the detection section 32. According to such a configuration, the size of the detection section 32 can be set larger with respect to the size of the variable wavelength interference filter 5, and thus the high-resolution image can be obtained with a larger number of detection elements. Therefore, more accurate and detailed spectral distribution measurement can be performed.

In other words, in the optical devices 1, 1A, and 1B of the first, second, and third embodiments, it is required to set the size of the effective measurement area G in the variable wavelength interference filter 5 and the size of the detection section 32 roughly the same as each other. Therefore, if the size of the detection section 32 is enlarged, it is necessary to enlarge also the size of the variable wavelength interference filter 5.

Here, since in the present invention the effective measurement area G with which the degradation of the resolution is within the allowable range is set, it is necessary to enlarge the size of the effective measurement area G in accordance with the detection section 32 so as to correspond to the size of the detection section 32. However, if the size of the variable wavelength interference filter 5 is enlarged in order for enlarging the size of the effective measurement area G, the amount of the deflection of the movable section 521 is increased in accordance with the amount of the enlargement. Therefore, there is a problem that there arises a necessity of setting the amount of the enlargement of the size of the variable wavelength interference filter 5 larger compared to the amount of the enlargement of the size of the effective measurement area, such that the it is required to double the filter size in order for enlarging the effective measurement area G to have the size 1.5 times as large as the original size, for example.

Further, in addition thereto, if the size of the variable wavelength interference filter 5 is enlarged, the electrical power for displacing the movable section 521 is also increased, and it becomes also difficult to keep the stress balance of the holding section 522 even, and therefore, the control for evenly displacing the movable section 521 becomes also difficult.

In contrast, in the present embodiment, since the configuration of magnifying the transmitted light by the magnifying lens system 36 and then receiving it by the detection section is adopted, it is not required to enlarge the size of the variable wavelength interference filter 5, and the variable wavelength interference filter 5 having a small size with respect to the detection section 32 can be used.

Action and Advantages of Fourth Embodiment

As described above, in the optical device 1C according to the fourth embodiment, the magnifying lens system 36 is disposed between the variable wavelength interference filter 5 and the detection section 32. Therefore, the size of the detection section 32 can be enlarged without enlarging the size of the variable wavelength interference filter 5. Therefore, the problem of degradation of the resolution, increase in the power consumption, control of the movable section 521, and so on due to the increase in size of the variable wavelength interference filter 5 does not arise, and the highly accurate spectral distribution measurement can easily performed using the detection section 32 having a large size.

Other Embodiments

It should be noted that the invention is not limited to the embodiments described above, but includes modifications and improvements within a range where the advantages of the invention can be achieved.

Figure 10:
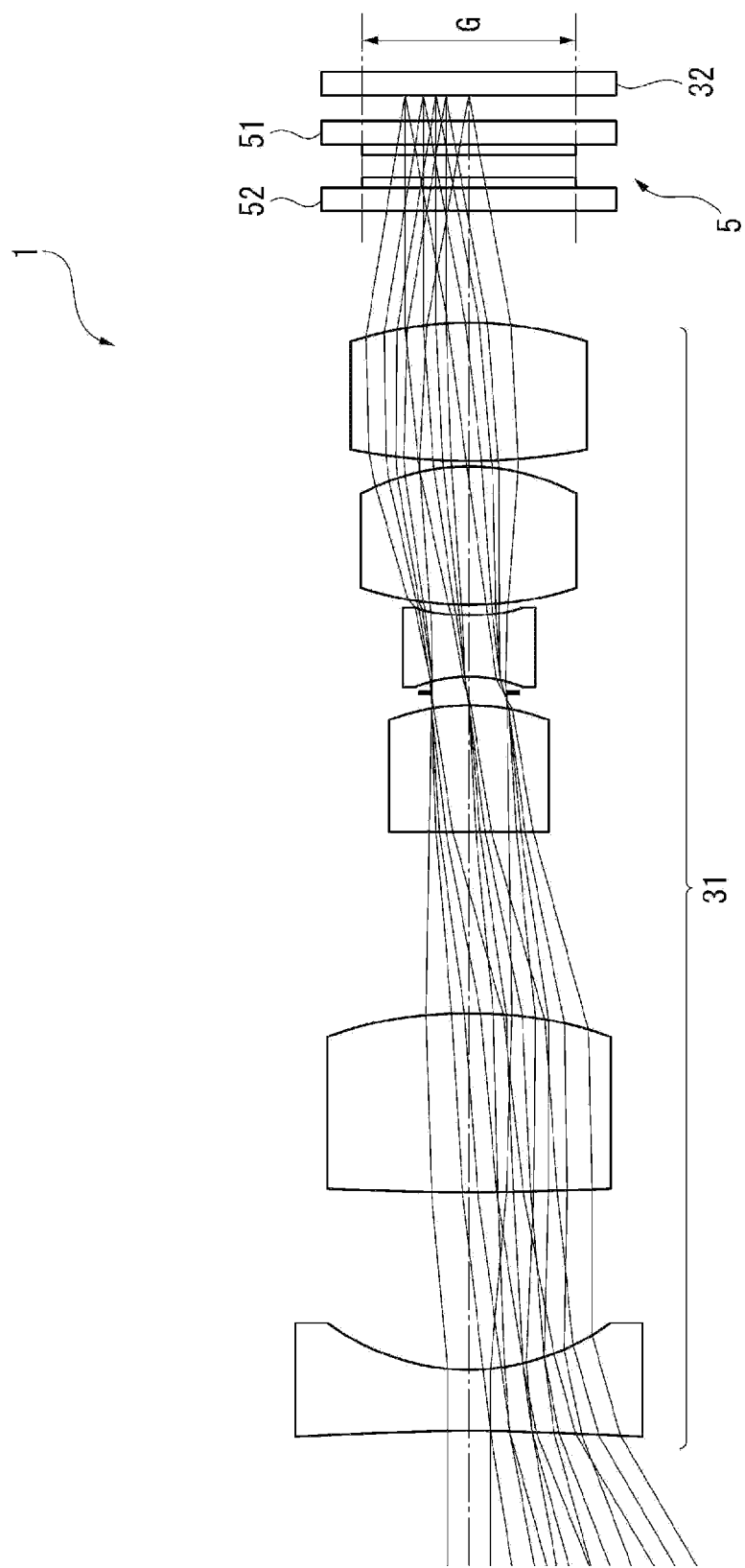
FIG. 10 is a diagram showing another example of the telecentric optical system.

For example, although in the first embodiment the configuration diagram having an aperture disposed inside the telecentric optical system 31 is shown in FIG. 2, the invention is not limited thereto. The lens group constituting the telecentric optical system 31 can be composed of any optical members providing the incident light within the field angle range, which can be imaged by the optical device 1, is collected in the effective measurement area G, and the principal rays thereof are parallel to each other, and input perpendicularly to the variable wavelength interference filter 5, and the number and types of the optical members are not limited. For example, the telecentric optical system having the configuration shown in FIG. 10 can also be provided.

Further, although in the embodiments described above, the electrostatic actuator 54 for displacing the movable section 521 while deflecting the holding section 522 in response to the voltage applied between the first electrode 541 and the second electrode 542 is described as an example of the gap varying section, the invention is not limited thereto.

For example, it is also possible to adopt the configuration of using a dielectric actuator disposing a first dielectric coil instead of the first electrode 541, and disposing a second dielectric coil or a permanent magnet instead of the second electrode. For example, in the configuration of disposing the first dielectric coil and the permanent magnet, the magnetic force is generated using the current flowing through the first dielectric coil as the input value, and the movable section 521 is displaced due to the attractive force or the repulsive force generated between the first dielectric coil and the permanent magnet.

Further, it is also possible to adopt the configuration of using a piezoelectric actuator instead of the electrostatic actuator 54. In this case, for example, a lower electrode layer, a piezoelectric film, and an upper electrode layer are disposed on the holding section 522 in a stacked manner, and the voltage applied between the lower electrode layer and the upper electrode layer is varied as an input value, and thus the piezoelectric film is expanded or contracted to thereby deflect the holding section 522.

Further, it is also possible to adopt the configuration of using an actuator utilizing pneumatic pressure instead of the electrostatic actuator 54. In this case, the space between the first substrate 51 and the second substrate 52 is formed as an enclosed space, and an air induction hole for introducing the air into the enclosed space is provided. Further, a pump for varying the inside air pressure is provided to the air induction hole, and the air pressure is varied as an input value to thereby displace the movable section 521 due to the variation in the internal pressure.

Further, although in the embodiments described above the holding section 522 shaped like a diaphragm is described as an example, it is also possible to adopt a configuration of, for example, providing a plurality of holding sections having a beam structure, and holding the movable section 521 with these holding sections having the beam structure. In this case, it is preferable to provide the holding sections symmetrical about the center axis O in order for making the deflection balance of the holding sections having the beam structure even.

Further, although in the embodiments described above there is shown the example of the variable wavelength interference filter having the configuration in which the inter-reflecting film gap between the first reflecting film and the second reflecting film is smaller than the inter-electrode gap between the first electrode and the second electrode, it is also possible to adopt the configuration in which the inter-reflecting film gap and the inter-electrode gap have the same dimension. Further, it is also possible to adopt the configuration of the variable wavelength interference filter in which the inter-reflecting film gap is larger than the inter-electrode gap.

Further, although there is described the configuration provided with the first circularly polarizing plate 34 in the second embodiment, and the configuration provided with the first circularly polarizing plate 34 and the second circularly polarizing plate 35 in the third embodiment as examples, it is also possible to adopt the configuration, for example, not provided with the first circularly polarizing plate 34, but provided only with the second circularly polarizing plate 35. Further, although in the fourth embodiment there is described the configuration provided with the first circularly polarizing plate 34 and the second circularly polarizing plate 35 as an example, it is also possible to adopt the configuration provided with either one of the first circularly polarizing plate 34 and the second circularly polarizing plate 35, or the configuration not provided with the first and second circularly polarizing plates 34, 35, for example.

Further, although in the third embodiment described above, there is adopted the configuration provided with the ¼-wave plate 351 facing to the variable wavelength interference filter 5 and the linearly polarizing plate 352 facing to the detection section 32 as the second circularly polarizing plate 35, the invention is not limited thereto. For example, it is also possible for the second circularly polarizing plate 35 to have the configuration provided with the linearly polarizing plate facing to the variable wavelength interference filter 5 and the ¼-wave plate facing to the detection section 32.

In this case, the linearly polarizing plate transmits, for example, the P-polarized wave and absorbs the S-polarized wave out of the right-handed circularly polarized wave transmitted through the variable wavelength interference filter 5. Further, the P-polarized wave transmitted through the linearly polarizing plate is converted by the ¼-wave plate into the right-handed circularly polarized wave, and is emitted toward the detection section 32. Further, the light component reflected by the detection section 32 has been converted into the left-handed circularly polarized wave due to the reflection, and is therefore converted by the ¼-wave plate into the S-polarized wave, and is absorbed by the linearly polarizing plate.

Besides the above, specific structures and procedures to be adopted when putting the invention into practice can arbitrarily be replaced with other structures and so on within the range in which the advantages of the invention can be achieved.

The entire disclosure of Japanese Patent Application No. 2010-254066, filed Nov. 12, 2010 is expressly incorporated by reference herein.

What is claimed is:

1. An optical device comprising:
a variable wavelength interference filter that include an effective measurement area and that transmits a first light reinforced by multiple interference out of an incident light;
a telecentric optical system that guides the incident light to the variable wavelength interference filter; and
a detection section that detects a second light transmitted through the variable wavelength interference filter,
wherein the variable wavelength interference filter includes
a first substrate,
a second substrate opposed to the first substrate and provided with a movable section, and a holding section that holds a periphery of the movable section and that holds the movable section so as to allow a back and forth movement of the movable section with respect to the first substrate,
a first reflecting film provided to the first substrate,
a second reflecting film provided to the movable section, and opposed to the first reflecting film via a gap having a center gap and a peripheral gap, and
a gap varying section that displaces the movable section to thereby vary a dimension of the gap,
the telecentric optical system guides a principal ray of the incident light perpendicularly to one of a plane of the first reflecting film and a plane of the second reflecting film, and collects the incident light in the effective measurement area of the variable wavelength interference filter,
a center, which has the center gap when the movable section is displaced with a maximum amount by the gap varying section, of the effective measurement area is in a central axis of the movable section, and a periphery, which has the peripheral gap when the movable section is displaced with the maximum amount by the gap varying section, of the effective measurement area is in a peripheral area of the first and second reflecting films, and
a gap difference between the center gap and the peripheral gap is within a predetermined nanometric range.

2. The optical device according to claim 1, wherein
the effective measurement area is capable to transmit the second light that has a predetermined allowable range of a wavelength, and
when the movable section is displaced with the maximum amount by the gap varying section, the gap difference is equal to or smaller than a half of the predetermined allowable range.

3. The optical device according to claim 1, further comprising:
a magnifying lens system disposed between the variable wavelength interference filter and the detection section, and adapted to magnify the second light transmitted through the variable wavelength interference filter.

4. The optical device according to claim 1, further comprising:
a first circularly polarizing plate that is disposed between the telecentric optical system and the variable wavelength interference filter, that transmits the first light proceeding from the telecentric optical system toward the variable wavelength interference filter, and that absorbs a first reflected light proceeding from the variable wavelength interference filter toward the telecentric optical system.

5. The optical device according to claim 1, further comprising:
a second circularly polarizing plate that is disposed between the variable wavelength interference filter and the detection section, that transmits the second light proceeding from the variable wavelength interference filter toward the detection section, and that absorbs a second reflected light proceeding from the detection section toward the variable wavelength interference filter.

6. The optical device according to claim 1, wherein
the predetermined nanometric range of the gap difference is 2.5 nm to 5.0 nm.

* * * * *